US007097441B2

(12) United States Patent
Sagar et al.

(10) Patent No.: US 7,097,441 B2

(45) Date of Patent: Aug. 29, 2006

(54) ANNULAR CO-EXTRUSION DIE

(75) Inventors: Surendra M. Sagar, Mississauga (CA); Mirek Planeta, Mississauga (CA)

(73) Assignee: Marco Engineering & Technology Inc., Mississauga (CA)

(*) Notice: Subject to any disclaimer, the term of this patent is extended or adjusted under 35 U.S.C. 154(b) by 173 days.

(21) Appl. No.: 10/724,197

(22) Filed: Dec. 1, 2003

(65) Prior Publication Data

US 2005/0118295 A1 Jun. 2, 2005

(51) Int. Cl.
*B29C 47/26* (2006.01)

(52) U.S. Cl. .............................. 425/133.1; 425/192 R; 425/380; 425/462

(58) Field of Classification Search ............. 425/133.1, 425/192 R, 380, 462
See application file for complete search history.

(56) References Cited

U.S. PATENT DOCUMENTS 3,809,515 A * 5/1974 Farrell ...................... 425/133.1
5,393,216 A * 2/1995 Teutsch et al. .......... 425/133.1
5,690,972 A * 11/1997 Planeta et al. .......... 425/133.1
5,716,650 A * 2/1998 Mavridis ................. 425/131.1
5,738,881 A * 4/1998 Sagar ...................... 425/133.1

* cited by examiner

*Primary Examiner*—Joseph S. Del Sole

(74) *Attorney, Agent, or Firm*—Robert F. Delbridge

(57) ABSTRACT

An annular co-extrusion die for extruding multi-layer tubular plastic film has inner die members stacked one upon another and having radially outwardly extending surfaces forming radially outwardly extending helical passages between respective pairs of inner die members. An annular outer die member surrounds the stacked inner die members and forms a longitudinally extending annular passage therebetween for conveying plastic material from the radially outwardly extending helical passages to an annular extrusion orifice. A lower inner die member has a first feed passage extending from a lower surface thereof to a substantially horizontal upper surface thereof at a position spaced from a central longitudinal axis of the longitudinally extending annular passage, the substantially horizontal upper surface having a first groove extending from the upper end of the first feed passage to the longitudinal axis. An upper inner die member immediately above the lower inner die member has a substantially horizontal lower surface engaged with the substantially horizontal upper surface of the lower inner die member, the substantially horizontal lower surface having a second groove extending from the upper end of the first feed passage to the longitudinal axis and forming a second fed passage with the first groove. The upper inner die member has a third feed passage extending substantially vertically upwardly from the lower substantially horizontal surface thereof at the longitudinal axis and in communication with the second feed passage. At least one fourth feed passage in the upper inner die member extends from an upper end of the third feed passage to the helical passages between the upper and lower inner die members.

3 Claims, 1 Drawing Sheet

ANNULAR CO-EXTRUSION DIE

FIELD OF INVENTION

The present invention relates to annular co-extrusion dies for extruding multi-layer tubular plastic film.

BACKGROUND OF THE INVENTION

Many different kinds of multi-layer plastic film are required for present day purposes. However, it is not possible to satisfactorily produce such different kinds of multi-layer plastic film with one kind of die. For example, the annular co-extrusion die described and claimed in U.S. Pat. No. 5,690,972 (Planeta et al.) issued Nov. 25, 1997, the contents of which are hereby incorporated herein by reference, is very useful because such a die is easy to take apart and clean and also has a relatively low wetted surface area compared to other dies of similar size.

However, the die described in the above patent is not as suitable as is currently desired for producing multi-layer tubular film which includes at least one layer of material which has poor flow characteristics. It is therefore an object of this invention to provide an annular co-extrusion die which has a similar versatility as the die described in the above patent, but which is especially suitable for producing tubular multi-layer film with at least one layer of material with poor flow characteristics.

SUMMARY OF THE INVENTION

According to the invention, an annular co-extrusion die for extruding multi layered tubular plastic film has inner die members stacked one upon another and having radially outwardly extending surfaces forming radially outwardly helical passages between respective pairs of inner die members. An annular outer die member surround the stacked inner die members and forms a longitudinally extending annular passage therebetween for conveying plastic material from said radially outwardly extending helical passages to an annular extrusion orifice. A lower inner die member has a first feed passage extending from a lower surface thereof to a substantially horizontal upper surface thereof at a position radially spaced from a central longitudinal axis of the longitudinally extending annular passage, the substantially horizontal upper surface having a first groove extending from the upper end of the first feed passage to the longitudinal axis.

An upper inner die member immediately above the lower inner die member has a substantially horizontal lower surface engaged with the substantially horizontal upper surface of the lower inner die member, a substantially horizontal lower surface having a second groove extending from the upper end of the first feed passage to the longitudinal axis and forming a second feed passage with the first groove. The upper inner die member has a third feed passage extending substantially vertically upwardly from the lower relatively horizontal surface thereof at the longitudinal axis and in communication with the second feed passage. At least one fourth feed passage in the upper inner die member extends from the upper end of the third feed passage to the helical passages between the upper and lower die members.

The radially outwardly extending surfaces may be inclined to the longitudinal axis of the die at an angle in the range from about 5 to about 90 degrees.

The inner die members may have a circumferentially extending series of vertically aligned substantially vertical passages for supplying cooling air to the inner side of tubular film extruded from the extrusion orifice.

BRIEF DESCRIPTION OF THE DRAWINGS

One embodiment of the invention will now be described, by way of example, with reference to the accompanying drawing, of which.

DETAILED DESCRIPTION

Figure 1:
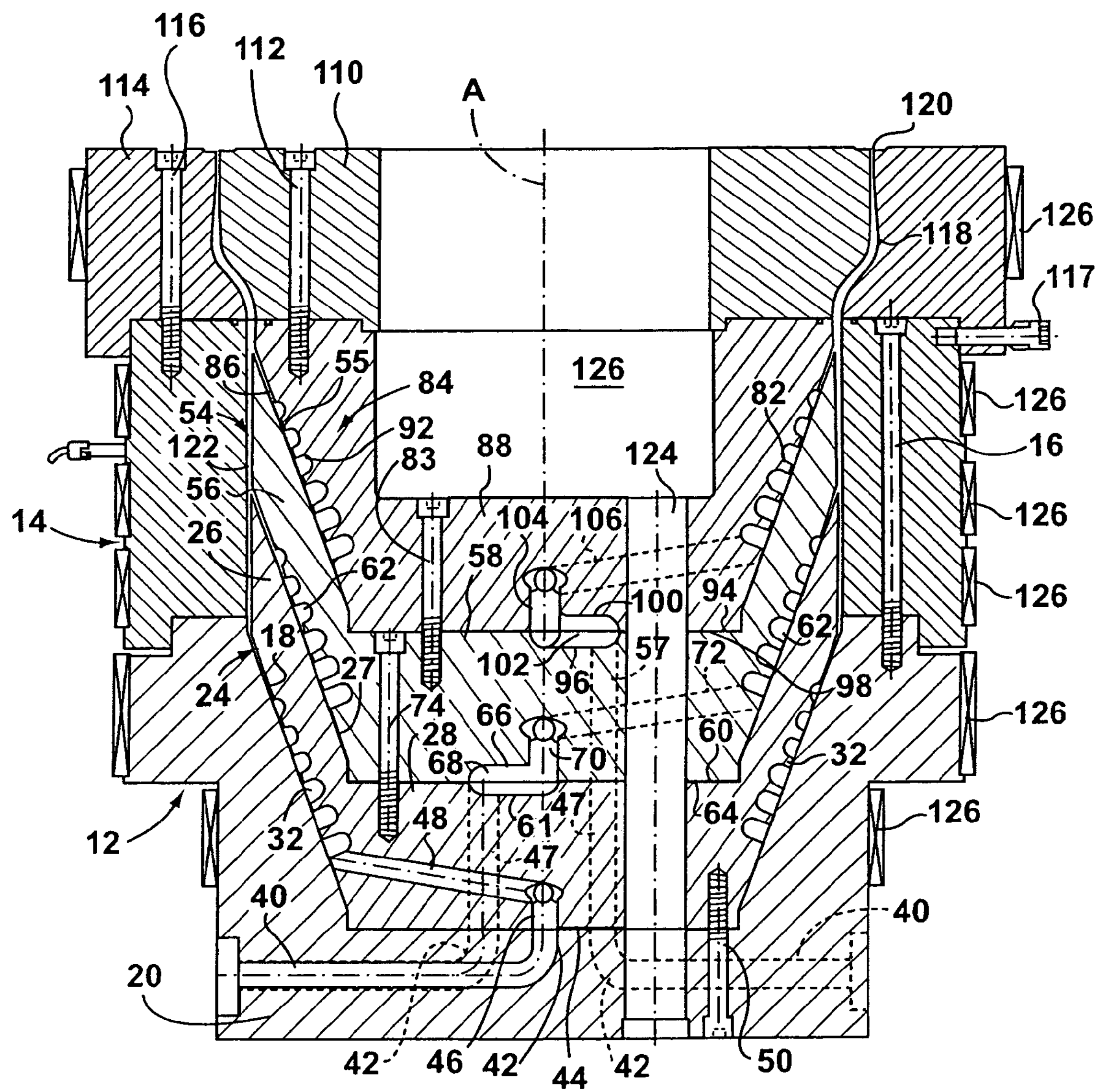
FIG. 1 is a sectional somewhat diagrammetic view of an annular extrusion die in accordance with one embodiment of the invention, with some parts being omitted for clarity.

Referring first to FIG. 1 of the drawing, an annular co-extrusion die has a lower annular outer die body member 12 and an annular outer die body member 14 mounted on the lower outer die member 12 and secured thereto by circumferentially spaced bolts 16 (only one of which is shown). The lower outer die member 12 has a radially outwardly and upwardly extending inner surface 18 which extends at an angle of about 20 degrees to the longitudinal axis A of the die. The lower outer die member 12 also has a base portion 20.

A first inner die mandrel 24 has a radially outwardly and upwardly extending side wall 26 and a base portion 28. The die mandrel 24 fits snuggly into the lower outer die member 12. The outer surface of the side wall 26 has a series of helical grooves 32 which co-operate with the inner surface 18 of the outer die member 12 to form outwardly and upwardly extending helical passages therebetween. The helical grooves 32 have multiple starts (not shown), in the same manner as shown in FIG. 2 of U.S. Pat. No. 5,690,792.

The base portion 20 of the lower outer die member 12 has a circumferentially extending series of horizontal feed passages 40 extending radially inwardly from the exterior of the base portion 20. At its inner end, each feed passage 40 has a 90 degree bend to a vertical passage portion 42 which opens onto the upper surface 44 of the base portion 20. One of the vertical feed passage portions 42 is at the radial centre of the base portion 20, ie. is located on the longitudinal axis A of the die.

The first inner die mandrel 24 has a vertical feed passage 46 extending upwardly for a short distance from its lower surface and aligned with the vertical portion 32 of the relevant feed passage 40. The base portion 28 of the first mandrel 28 has a circumferentially extending series of transverse feed passages 48 extending in a radially outwardly and slightly upward manner from the upper end of the vertical feed passage 46, each feed passage 48 extending to the lower end of a respective one of the helical grooves 32. For clarity, only one of the feed passages 48 is shown. The base portion 28 of the mandrel 24 is bolted to the base portion 20 of the lower outer die member 12 by circumferentially spaced bolts 50 (only one of which is shown).

The base portion 28 of the mandrel 24 also has two circumferentially spaced vertical feed passages 47 extending from the bottom to the top thereof and radially spaced from the longitudinal axis A of the die for a purpose which will be described later.

A second mandrel 54 which is identical to the lower mandrel 24 is mounted on top of the lower mandrel 24 and is nested therein, ie. in stacking relationship therewith. The second mandrel 54 has a radially outwardly and upwardly extending sidewall 56 and a base portion 58. The outer surface of side wall 56 has a series of helical grooves 62 which co-operate with the inner surface 27 of the lower mandrel 24 to form radially outwardly and upwardly extending helical passages therebetween. As before, the helical groove 62 have multiple starts (not shown) at their lower ends. One of the vertical passage portions 42 of a feed passage 40 is radially spaced from the longitudinal axis A of the die (to the left thereof as seen in FIG. 1), and is aligned with one of the vertical passages 47 in the base portion 28 of the first mandrel 24.

The base portion 58 of the mandrel 54 also has a vertical feed passage 57 extending vertically from the bottom to the top thereof and radially spaced from the longitudinal axis A of the die and aligned with the other vertical passage 47 in the base portion 28 of the first mandrel 24, again for a purpose which will be described later.

The upper surface 60 of the base portion 28 of the first mandrel 24 has a groove 61 extending radially inwardly from the upper end of one of the vertical feed passages 47 to the longitudinal axis A of the die. The lower surface 64 of the base portion 58 of the mandrel 54 has a complementary groove 66 forming a horizontal passage 68 with the groove 62. At its radially outer end, the horizontal passage 68 communicates with the top of the relevant vertical passage 47, and at the longitudinal axis A communicates with a short vertical passage 70 in the base portion 58. The base portion 58 also has a circumferentially extending series of transverse feed passages 72 (only one of which is shown) extending in a radially outwardly and slightly upwardly inclined manner from the upper end of the vertical passage 70, each feed passage 72 extending to the lower end of a respective one of the helical grooves 62. The second mandrel 54 is bolted to the first mandrel 24 by circumferentially spaced bolts 74 (only one of which is shown).

A further and uppermost die mandrel 84 is mounted on top of the second mandrel 54 and is nested therein, ie, in stacked relationship therewith. The mandrel 84 has a radially outwardly and upwardly inclined outer surface 84 and a base portion 88. The outer surface 86 has a series of helical grooves 92 which co-operate with the inner surface 55 of side wall 56 to form radially outwardly and upwardly extending helical passages therebetween. As before, the helical grooves 92 have multiple starts at their lower ends. The base portion 88 of the mandrel 84 is secured to the base portion 58 of the mandrel 54 by circumferentially spaced bolts 93 (only one of which is shown).

The upper surface 94 of the base portion 58 of the second mandrel 54 has a groove 96 extending radially inwardly from the upper end of the passage 57 in the base portion 58 of the second mandrel 54 to the longitudinal axis A of the die. The lower surface 98 of the base portion 88 of the mandrel 84 has a complementary groove 100 forming a horizontally extending passage 102 with the groove 96. At its radially outer end, the horizontal groove 102 communicates with the top of the vertical passage 57 and at the longitudinal axis A communicates with a short vertical passage 104 in the base portion 88 of mandrel 84. Base portion 88 also has a circumferentially extending series of helical feed passages 106 (only one of which is shown) extending in a radially outwardly and slightly upward inclined manner from the upper end of the vertical passage 104, each feed passage 106 extending to the lower end of the respective one of the helical grooves 92.

An inner annular die lip member 110 is mounted on top of the upper mandrel 84 and is secured thereto by bolts 112 (only one of which is shown). An outer annular die lip member 114 is mounted on the upper outer die member 14 and secured thereto by bolts 116, 117 (only one each of which is shown). The die members 110, 114 co-operate to form an annular extrusion passage 118 and an annular extrusion orifice 120.

An annular extrusion passage 112 is formed between the outer surfaces of the mandrels 24, 54, 84 and the inner surfaces of the outer die member 14. The annular extrusion passage 122 extends to the annular extrusion passage 118 formed by the die lip members 110, 114. The outer die members 12, 14 and the outer lip member 114 are provided with separate heaters 126.

To enable internal bubble cooling to be provided, the base portions 20, 28, 58, 88 of the lower outer die member 12 and the mandrels 24, 54, 84 are provided with relatively large aligned circumferentially spaced vertical passages 124 for supplying cooling air from the bottom of the die to a central chamber 126 at the top of the die and provided by the upper mandrel 84 and inner die lip member 110. The vertical passages 124 extend between the transverse passages 48, 72, 106.

In use, different plastic materials are supplied from extruders through the feed passages 40. As shown, one of the feed passages 40 supplies plastic material to the vertical feed passage 46 and the transverse feed passages 48 to the helical grooves 32 so as to extrude a first film layer into the annular passage 122. Another passage 40 feeds plastic material to the vertical passage 47, horizontal passage 68 and vertical passage 70 to transverse passages 72 and helical grooves 62 to extrude a second film layer into the annular passage 122. A third passage 40 feeds plastic material through the vertical passages 47, 57, the horizontal passage 102 and the vertical passage 104 to the transverse passages 106 and the helical grooves 92 to extrude a third film layer into the annular passage 122. Thus, a three layer plastic film is extruded into the annular passage 118 and from the extrusion orifice 120.

A person skilled in the art will readily appreciate from the foregoing description of a preferred embodiment that the present invention reduces the likelihood of uneven flow in the die. Also, a die in accordance with the invention provides good melt distribution and enables a wide variety of plastic materials with a wide variety of viscosities to be processed in the same die. Additionally, of course, a greater or small number of mandrels and outer die members may be used when the film to be produced has more or less than three layers.

Other embodiments and advantages of the invention will now be readily apparent to a person skilled in the art, the scope of the invention being defined in the appended claims.

We claim:

1. An annular co-extrusion die for extruding multi-layer tubular plastic film, said die including:

inner die members stacked one upon another and having radially outwardly extending surfaces forming radially outwardly extending helical passages between respective pairs of inner die members;

an annular outer die member surrounding said stacked inner die members and forming a longitudinally extending annular passage therebetween for conveying plastic material from said radially outwardly extending helical passages to an annular extrusion orifice;

a lower inner die member having a first feed passage extending from a lower surface thereof to a substantially horizontal upper surface thereof at a position spaced from a central longitudinal axis of said longitudinally extending annular passage, said substantially horizontal upper surface having a first groove extending from the upper end of said first feed passage to said longitudinal axis;

an upper inner die member immediately above said lower inner die member having a substantially horizontal lower surface engaged with the substantially horizontal upper surface of said lower inner die member, said substantially horizontal lower surface having a second groove extending from the upper end of said first feed passage to said longitudinal axis and forming a second feed passage with said first groove;

said upper inner die member having a third feed passage extending substantially vertically upwardly from the lower substantially horizontal surface thereof at said longitudinal axis and in communication with said second feed passage; and at least one fourth feed passage in said upper inner die member extending from an upper end of said third feed passage to the helical passages between said upper and lower inner die members.

2. An annular co-extrusion die according to claim 1 wherein the radially outwardly extending surfaces are inclined to the longitudinal axis of the die at an angle in the range of from about 5 to about 90 degrees.

3. An annular co-extrusion die according to claim 1 wherein the inner die members have a circumferentially extending series of vertically aligned substantially vertical passages for supplying cooling air to the inner side of tubular film extruded from the extrusion orifice.

* * * * *